US 8,990,000 B2

United States Patent
Rhode et al.

(10) Patent No.: US 8,990,000 B2
(45) Date of Patent: Mar. 24, 2015

(54) ACTIVE SUSPENSION WITH LOAD DETECTION AND ADAPTATION

(71) Applicant: Ford Global Technologies, LLC, Dearborn, MI (US)

(72) Inventors: Doug S. Rhode, Farmington Hills, MI (US); Jianbo Lu, Livonia, MI (US); Eric Hongtei Tseng, Canton, MI (US); Dimitar Petrov Filev, Novi, UT (US); Davor Hrovat, Ann Arbor, MI (US); David Michael Russell, Ann Arbor, MI (US); Uwe Hoffmann, Leverkusen (DE); Peter W. A. Zegelaar, Heerlen (NL); Moshen Lakehal-ayat, Aachen (DE); Michael Seemann, Cologne (DE); Simon Baales, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/868,570

(22) Filed: Apr. 23, 2013

(65) Prior Publication Data

US 2014/0316637 A1    Oct. 23, 2014

(51) Int. Cl.
*G06G 7/48* (2006.01)
*B60G 17/018* (2006.01)
*B60G 17/017* (2006.01)
*B60G 17/02* (2006.01)
*B60G 17/06* (2006.01)

(52) U.S. Cl.
CPC .......... *B60G 17/0182* (2013.01); *B60G 17/017* (2013.01); *B60G 17/02* (2013.01); *B60G 17/06* (2013.01); *B60G 2400/0511* (2013.01); *B60G 2400/0512* (2013.01); *B60G 2400/0513* (2013.01); *B60G 2400/10* (2013.01); *B60G 2400/102* (2013.01); *B60G 2400/104* (2013.01); *B60G 2400/106* (2013.01); *B60G 2400/204* (2013.01); *B60G 2400/2042* (2013.01); *B60G 2400/208* (2013.01); *B60G 2400/252* (2013.01); *B60G 2400/33* (2013.01); *B60G 2400/39* (2013.01); *B60G 2400/41* (2013.01); *B60G 2400/52* (2013.01); *B60G 2400/62* (2013.01); *B60G 2400/82* (2013.01); *B60G 2401/174* (2013.01); *B60G 2500/10* (2013.01); *B60G 2500/20* (2013.01)
USPC ........................................................ 701/124

(58) Field of Classification Search
None
See application file for complete search history.

(56) References Cited

U.S. PATENT DOCUMENTS

| | | | |
|---|---|---|---|
| 4,761,022 A | 8/1988 | Ohashi et al. | 280/772 |
| 4,903,983 A | 2/1990 | Fukushima et al. | 280/707 |
| 5,113,345 A | 5/1992 | Mine et al. | 364/424.05 |
| 5,136,513 A * | 8/1992 | Sol et al. | 701/124 |

(Continued)

OTHER PUBLICATIONS

Title: Center of Gravity Estimation and Rollover Prevention Using Multiple Models & Controllers Author: Selim Solmaz, Mehmet Akar and Robert Shorten, Publication Date: N/A. Source: http://www.hamilton.ie/selim/solmazakarshorten-yale08.pdf.

*Primary Examiner* — John R Olszewski
*Assistant Examiner* — Navid Ziaeianmehdizadeh
(74) *Attorney, Agent, or Firm* — L.C. Begin & Associates, PLLC (57) ABSTRACT

A method for estimating a location of a center of gravity (CG) of a sprung mass of a vehicle includes steps of a) determining whether the vehicle is stationary or moving; b) if the vehicle is stationary, calculating estimated x and y coordinates of the CG; c) storing the estimated coordinates in memory; and d) repeating steps a)-c) until the vehicle is no longer stationary.

16 Claims, 7 Drawing Sheets

(56) References Cited

U.S. PATENT DOCUMENTS

| | | | |
|---|---|---|---|
| 5,825,284 A | 10/1998 | Dunwoody et al. | 340/440 |
| 6,502,023 B1* | 12/2002 | Fukada | 701/38 |
| 6,526,334 B1* | 2/2003 | Latarnik et al. | 701/1 |
| 7,317,982 B2* | 1/2008 | Tsukasaki et al. | 701/70 |
| 7,440,844 B2* | 10/2008 | Barta et al. | 701/124 |
| 7,477,972 B2 | 1/2009 | Stavroff et al. | 701/38 |
| 7,526,376 B2 | 4/2009 | Huang et al. | 701/124 |
| 7,877,201 B2* | 1/2011 | Lu et al. | 701/124 |
| 7,949,445 B2* | 5/2011 | Poilbout | 701/37 |
| 8,560,217 B2* | 10/2013 | Sverrisson | 701/124 |
| 2002/0038193 A1* | 3/2002 | Grunberg et al. | 702/173 |
| 2004/0133338 A1* | 7/2004 | Verhagen et al. | 701/124 |
| 2005/0177296 A1* | 8/2005 | Brown et al. | 701/70 |
| 2007/0078581 A1 | 4/2007 | Nenninger et al. | 701/70 |
| 2009/0024269 A1* | 1/2009 | Shorten et al. | 701/29 |
| 2009/0024310 A1* | 1/2009 | Karrie et al. | 701/124 |
| 2009/0235724 A1* | 9/2009 | Ryu et al. | 73/65.01 |
| 2010/0036597 A1* | 2/2010 | Fiedler et al. | 701/124 |
| 2010/0198492 A1* | 8/2010 | Watanabe | 701/124 |
| 2010/0320703 A1 | 12/2010 | Lin et al. | 280/5.507 |
| 2011/0224895 A1* | 9/2011 | Kroeger | 701/124 |
| 2012/0173084 A1* | 7/2012 | Ertlmeier et al. | 701/45 |
| 2012/0259536 A1* | 10/2012 | Klier | 701/124 |
| 2013/0013146 A1* | 1/2013 | Marur | 701/36 |
| 2014/0114558 A1* | 4/2014 | Singh et al. | 701/124 |

\* cited by examiner

ACTIVE SUSPENSION WITH LOAD DETECTION AND ADAPTATION

BACKGROUND OF THE INVENTION

The mass of a motor vehicle depends upon a variety of factors, including the vehicle design, loading, fluid, levels, options and accessories. Because of these factors, vehicles are designed assuming a range of mass varying from the unloaded curb weight to GVW (gross vehicle weight). The vehicle mass and, in particular, the location of the center of gravity (CG) of the vehicle sprung mass, has an impact upon the vehicle's dynamic behavior. The uncertainty in vehicle mass and in the location of the CG often results in compromises in handling and ride. For example, although a lower suspension spring rate (which enhances ride qualities) may be feasible for an unloaded vehicle, such a lower spring rate may not be acceptable for a more heavily loaded vehicle because the extra loading may take up all of the travel available in the suspension. If the vehicle mass and sprung CG location can be measured or estimated, the need for many of these compromises can be eliminated, resulting in improved vehicle performance, ride, and handling.

SUMMARY OF THE INVENTION

In one aspect of the embodiments described herein, a method is provided for estimating a location of a center of gravity (CG) of a sprung mass of a vehicle. The method includes steps of a) determining whether the vehicle is stationary or moving; b) if the vehicle is stationary, calculating estimated x and y coordinates of the CG: c) storing the estimated coordinates in memory; and d) repeating steps a)-c) until the vehicle is no longer stationary.

In another aspect of the embodiments described herein, a method is provided for estimating a location of a center of gravity (CG) of a sprung mass of a vehicle. The method includes steps of: a) determining whether the vehicle is stationary or moving; b) if the vehicle is not stationary, determining a roll acceleration of the vehicle; and c) if the roll acceleration effectively non-zero, repeating steps a) and b) until the roll acceleration is effectively zero or until the vehicle is stationary.

DETAILED DESCRIPTION

Similar elements incorporated into the various embodiments of the systems described herein have been given similar reference numerals.

Figure 1:
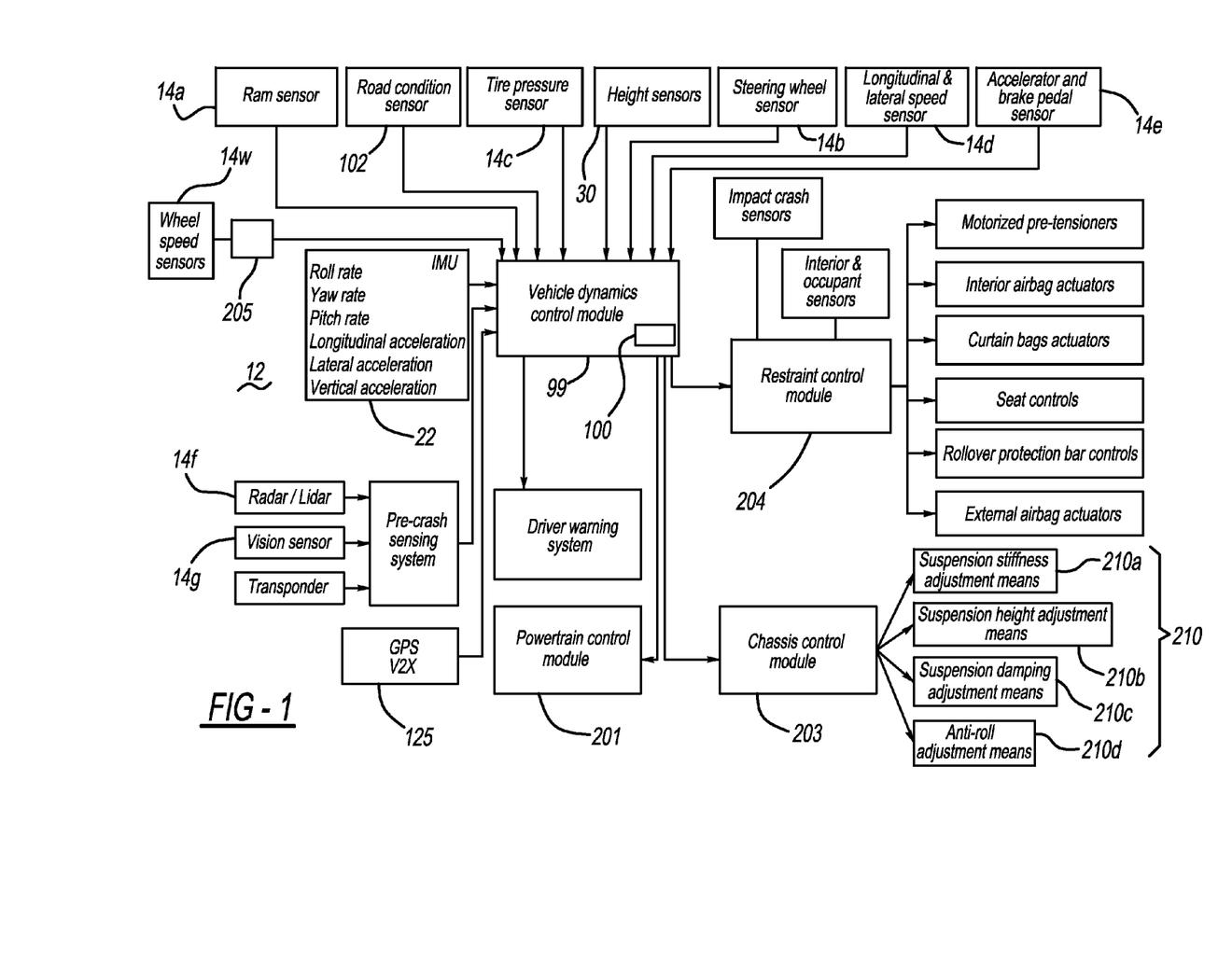
FIG. 1 is a schematic diagram of a vehicle control system incorporating an adaptive active suspension control system.

FIG. 1 is a schematic diagram of a vehicle control system 12 incorporating an active suspension system. Control system 12 includes an array of vehicle sensors designed to monitor various vehicle parameters and environmental conditions external to the vehicle. The sensor array includes various types of sensors operatively coupled to one or more system control modules so as to enable transmission of the sensor inputs to the control module(s). The sensor array may include individual sensors or groups of associated sensors (such as radar, lidar, laser scan, or vision/camera systems) for detecting aspects of the vehicle environment and for detecting, for example, a pending collision; inertial sensors (for example, a known or suitable inertial measurement unit (IMU) 22), various wheel speed sensors 14w, road condition sensors 102 if direct measurements of certain road conditions are possible, rain sensors 14a, suspension height sensors 30, steering wheel angle sensors 14b, steering torque sensors, brake pressure sensors, tire pressure sensors 14c; sensors (such as a Global Positioning System (GPS) 125) directed to aiding in vehicle location and navigation; cooperative sensors for enabling and facilitating operation of vehicle-to-vehicle communication and vehicle-to-infrastructure communication systems (if any), and other types of sensors. A group of associated sensors (for example, a road condition sensor suite) may include multiple different types of sensors, depending on the tasks the suite is required to perform in a given control system. In the particular embodiment shown in FIG. 1, the sensor array includes a road condition sensor or a sensor suite 102 comprising one or more known road condition sensors. The road condition sensors may measure such features as, for example, the road temperature, whether the road surface is wet or dry, the salinity of any road surface moisture, and the presence of snow on the road. The road condition sensors may include such elements as laser scanners or cameras to enable visual or digital scanning of a portion of the road surface being traversed by the vehicle.

The control system 12 also includes one or more control modules operatively coupled to associated sensors (or groups of sensors), to other control modules, and/or to other elements of the control system. Examples of such control modules include a vehicle dynamics control module (or VDCM) 99 or similar main control module, and control modules incorporated into various vehicle subsystems, such as a powertrain control module 201, a chassis control module 203, and a vehicle occupant restraint control module 204, and a brake control module 205. In a manner known in the art, the VDCM 99 receives inputs from various sensors, processes these inputs in accordance with a stored control logic or control routine, and generates control signals which are transmitted to various actuatable control system elements or to suitable subordinate or lower level control modules (for example, chassis control module 203) which control elements of an active suspension system (generally designated 210 in FIG. 1)).

While the interactions among all actuatable vehicle systems are of interest, a method for estimating a location of a center of gravity (CG) of a sprung mass of a vehicle as described herein is implemented using elements of an active suspension system 210 where such characteristics as suspension travel or height, suspension damping, suspension stiffness, and suspension force are adjustable in real time with actuation response times low enough to enable suspension, system control responsive to predicted or actual abnormal road conditions encountered by a vehicle wheel. The suspension actuations are adaptive to estimated or predicted road conditions determined using the aforementioned sensing systems and an associated processing means (embodied, for example, in VDCM 99) configured to process data received from the sensing systems and determine the type and severity of the abnormal road condition.

In a manner known in the art, the various control modules include processing means which receive and process inputs from the associated sensors or from other elements of the control system (such as other control modules) to generate control signals responsive to the inputs. These control signals are then transmitted to one or more associated actuatable vehicle elements, in a manner known in the art. The actuatable vehicle elements and sub-systems operate responsive to the received control signals to control the ride and handling characteristics associated with the vehicle. In certain embodiments, the vehicle may also incorporate cooperative or interactive communication systems, such as vehicle-to-vehicle and/or vehicle-to-infrastructure communications systems.

In the embodiments described herein, the suspension forces generated by the active suspension at each corner of the vehicle are used to estimate the total mass of the vehicle, the sprung mass, and the location of the center of gravity of the sprung mass.

Figure 2:
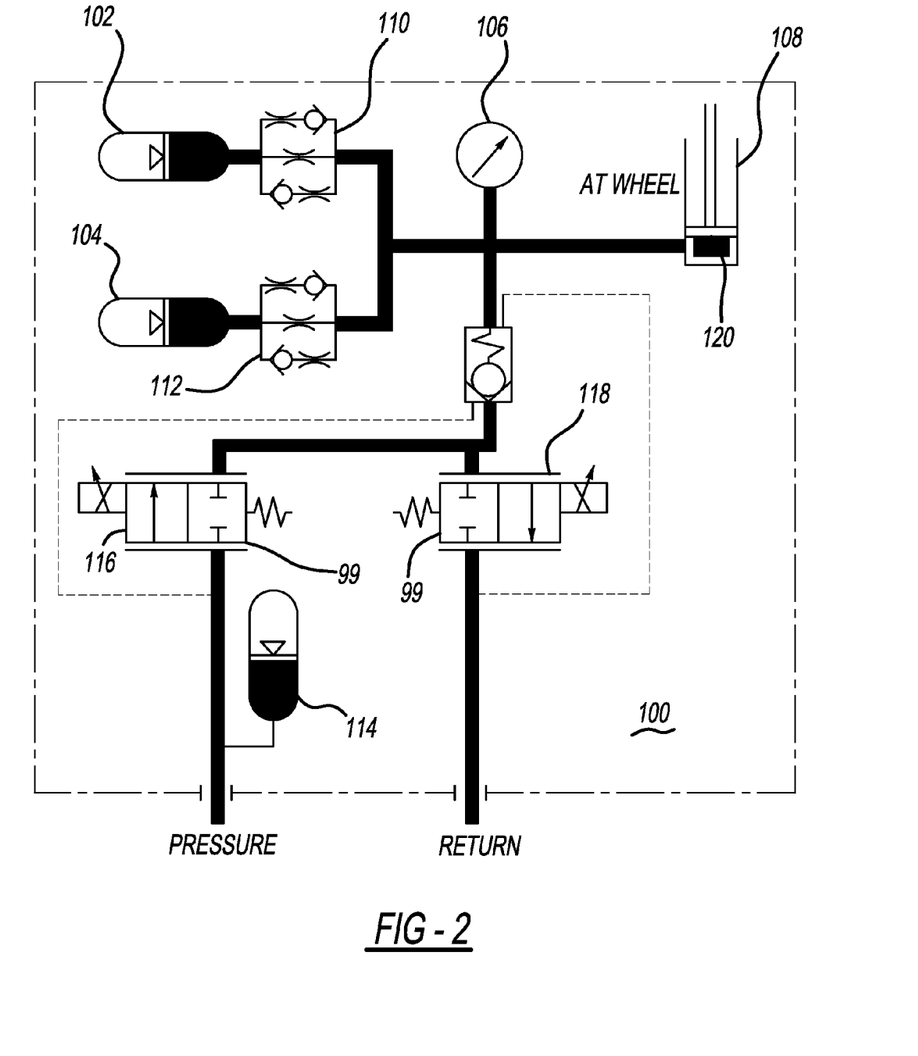
FIG. 2 is a schematic diagram of a portion of one embodiment of an active suspension system usable in a vehicle implementing a method for estimating a location of a center of gravity (CG) of a sprung mass of the vehicle.
Figure 3:
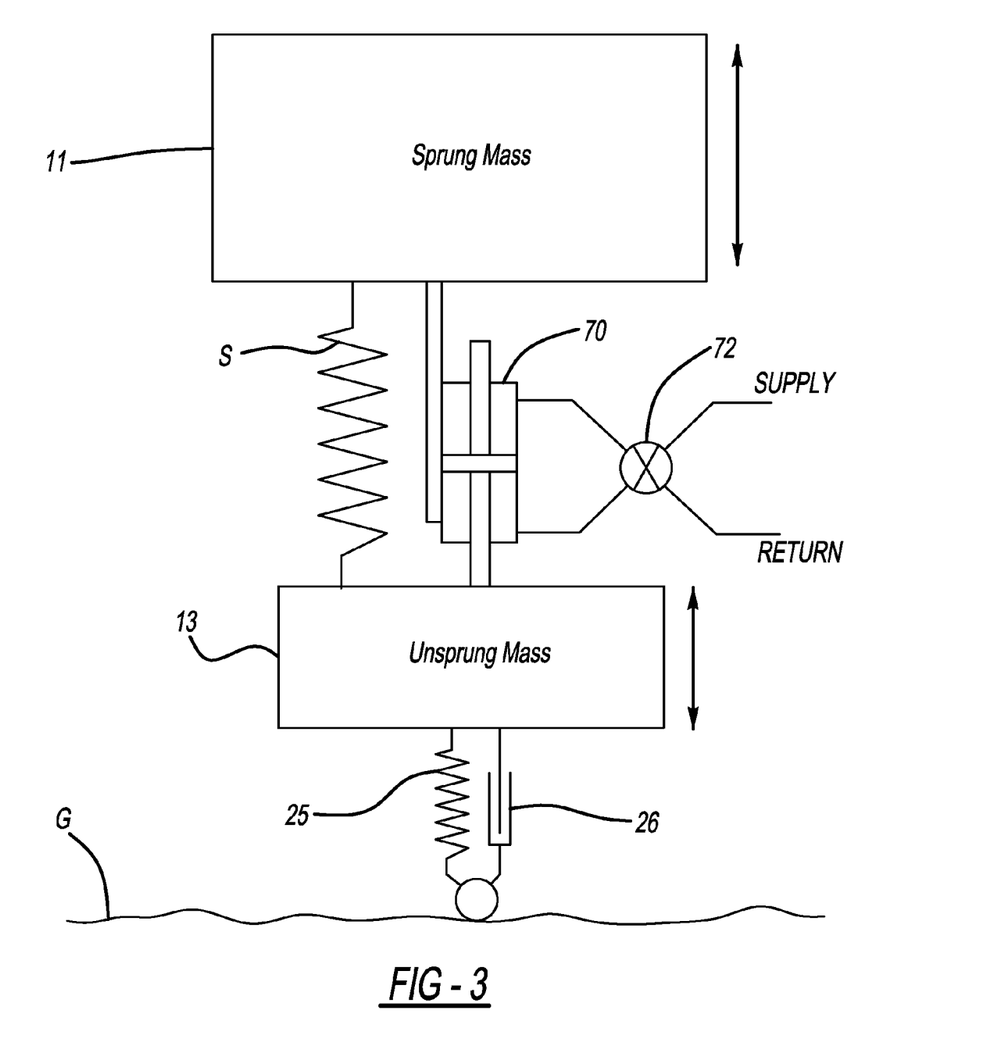
FIG. 3 is a schematic diagram of a portion of another embodiment of an active suspension system usable in a vehicle implementing a method for estimating a location of a center of gravity (CG) of a sprung mass of the vehicle.

FIGS. 2-3 are schematic diagrams of various embodiments of suspensions at one wheel of a vehicle incorporating an active suspension system of a type which may be controlled using a VDCM or microprocessor-based controller, as known in the art. Also as known in the art, in a vehicle incorporating an active suspension system, ride characteristics can be improved by adjusting suspension damping and/or spring rate characteristics responsive to control signals from the VDCM or other vehicle control modules. FIGS. 2-3 show embodiments of various active suspension structures usable for supporting the vehicle wheel. Other wheel suspension structures may also be used, provided that their spring and damping characteristics are controllable using a suitable controller as described herein.

FIG. 2 shows an example of a hydro-pneumatic active wheel suspension, generally designated 100. A high pressure pump (not shown) powered by the vehicle engine pressurizes the hydraulic fluid and an accumulator 114 maintains a reserve of hydraulic power. Pressure flows from through hydraulic circuit to the suspension actuator 108 to pressurize the actuator, thereby moving a piston within the actuator. Damping is provided by damping valves 110, 112 positioned between the main hydraulic line and one or more gas springs 102, 104. Controller 99 controls the operation of fill valve 116 and vent valve 118 according to the requirements of a particular application.

FIG. 3 shows a schematic diagram of one corner of another embodiment of an active suspension system. In one embodiment, the elements shown in FIG. 3 can be viewed as a single vehicle wheel movable in a vertical direction. In this representation, the mass of the vehicle's body is represented by the sprung mass 11. The wheel, represented by the unsprung mass 13, may be attached to the vehicle body 11 by a control arm (not shown). The body 11 is supported above the unsprung wheel mass 13 by an active suspension system including a control arm, an actuator 70, and a spring S acting in parallel with the actuator. In this system, all the forces supporting the sprung mass are exerted through the actuator 70 and the spring S. In the embodiment shown, actuator 70 is in the form of a double acting cylinder operatively coupled to a control valve 72. By controlling a fluid flow into or out of actuator 70 (for example, through the use of suitable control signals from controller 99 to control valve 72), the vehicle suspension forces and ride heights can be controlled. The wheel's unsprung mass 13 is supported by the road surface G, the tire deflection being represented in FIG. 3 by a spring 25 and a damper 26.

Figure 4:
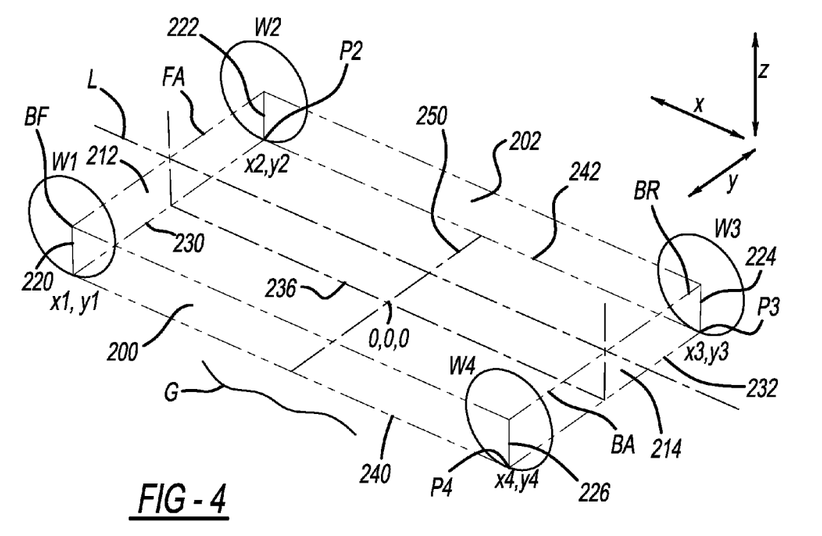
FIGS. 4 and 4A show schematic a representation of the supporting forces acting on a vehicle at each wheel when the vehicle is stationary.
Figure 4A:
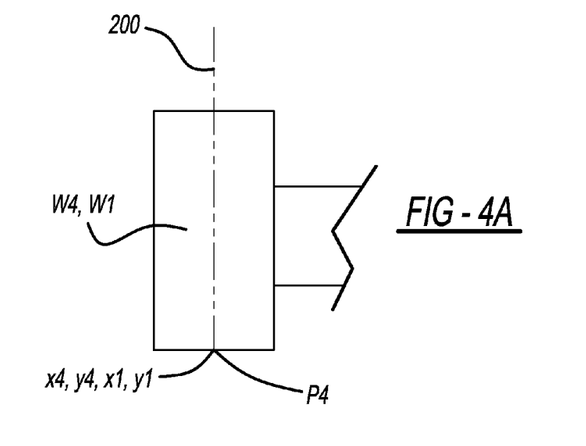

The suspension system described herein implements a method for estimating the location (in space) of the vehicle center of gravity CG or center of mass. FIGS. 4 and 4A show one representation of the supporting forces acting on the vehicle at each wheel when the vehicle is stationary. In the embodiment shown in FIGS. 4 and 4A, the coordinates x and y represent distances of the centers of the wheel tire patches P1-P4 from a reference 0, 0. As seen in FIG. 4, the x-axis extends parallel to the fore-aft axis L of the vehicle, or in the longitudinal direction of the vehicle. The y-axis extends transversely or perpendicularly to the x-axis. The z-axis extends vertically, perpendicular to both the x and y axes. In addition, the zero reference value of the z-axis coordinate is taken to be at road level, as shown in FIG. 4.

In one embodiment, the reference 0, 0, 0 is defined by extending vertical planes 212, 214 through each of the rotational axis BF of the front axle FA, and the rotational axis BR of the rear axle RA. Another vertical plane 200 bisects the widths of the left hand (LH) wheels when the left wheels are aligned in parallel with the vehicle fore-aft axis L. Another vertical plane 202 bisects the widths of the right hand (RH) wheels when the right wheels are aligned in parallel with the vehicle fore-aft axis L.

Planes 200 and 212 intersect at a line 220. The point of intersection of line 220 with the road surface G provides the coordinates x1, y1 of the tire patch of first wheel W1.

Planes 202 and 212 intersect at a line 222. The point of intersection of line 222 with the road surface G provides the coordinates x2, y2 of the tire patch of second wheel W2.

Planes 202 and 214 intersect at a line 224. The point of intersection of line 224 with the road surface G provides the coordinates x3, y3 of the tire patch of third wheel W3.

Planes 200 and 214 intersect at a line 226. The point of intersection of line 226 with the road surface G provides the coordinates x4, y4 of the tire patch of fourth wheel W4.

A line 230 connects points x1, y1 and x2, y2. Another line 232 connects points x3, y3 and x4, y4. A line 236 bisects both of lines 230 and 232. Line 236 is coincident with or coplanar with fore-aft axis L.

A line 240 connects points x1, y1 and x4, y4. Another line 242 connects points x3, y3 and x2, y2. Another line 250 bisects both of lines 240 and 242. The intersection of lines 236 and 250 defines the point 0, 0.

FIG. 4A shows a view from the rear of the vehicle of wheel W4 and wheel W1 in alignment, and showing the plane 200 bisecting the wheel widths. FIG. 4A also shows tire patches P1 (associated with wheel W1) and P4 (associated with wheel W4) in alignment along an axis extending parallel to axis L.

For purposes of defining a coordinate reference, the dimensions and locations described above can be determined when the vehicle is in an unloaded condition. As the point 0, 0 resides on the road surface G, the positive direction of the CG z-coordinate is measured upward from the road surface.

Although FIGS. 4 and 4A describe one possible method for establishing a coordinate system for determining the parameters used in embodiments of the method described herein, alternative coordinate systems may also be used.

When the vehicle is stationary, the total sprung mass $M_{sprung}$ of the vehicle may be defined as the sum of the vehicle corner forces according to the relationship:

$$M_{SPRUNG} = (\Sigma F_i)/g \quad (1)$$

where $F_i$ is the suspension force supporting a corner of the sprung mass at an $i^{th}$ corner of the vehicle, and g is the gravitational constant. The x and y coordinates of the CG when the vehicle is stationary are given by the following relationships:

$$x_{CG} = (\Sigma F_i x_i)/\Sigma F_i \quad (2)$$

$$y_{CG} = (\Sigma F_i y_i)/\Sigma F_i \quad (3)$$

where $x_i$ is the x coordinate and $y_i$ is the y coordinate of the location where the force $F_i$ is applied to the sprung mass. The locations of application of the forces $F_i$ at each wheel are known for a given suspension configuration.

In the hydro-pneumatic suspension embodiment shown in FIG. 2, the supporting force $F_{ai}$ exerted by the actuator at an $i^{th}$ wheel can be estimated by the relationship:

$$F_{ai} = p_i a_i \quad (4)$$

where the quantity "$p_i$" is the hydraulic pressure to the actuator (as indicated, for example, by the pressure sensor 106) and the quantity "$a_i$" is the effective area of the actuator piston 120 at the wheel.

For implementations such as that shown in FIG. 3, the vehicle supporting forces are split between an actuator force $F_a$ and a force (or forces) $F_s$ exerted by one or more passive components, such as spring S. Force $F_{si}$ acts through a spring $S_i$ at an $i^{th}$ wheel location according to the relationship:

$$F_{si} = k_i x_i \quad (5)$$

where $k_i$ is the spring constant at the $i^{th}$ wheel location and $x_i$ is the relative displacement of the ends of the spring at the $i^{th}$ wheel location, as known in the art. If desired, the quantity $x_i$ can be measured using a displacement sensor. A combined suspension force $F_i$ provided by the suspension at each corner can be calculated by calculating the force provided by each component, using the above relationships:

$$F_i = F_{ai} + F_{si} \quad (6)$$

Figure 5:
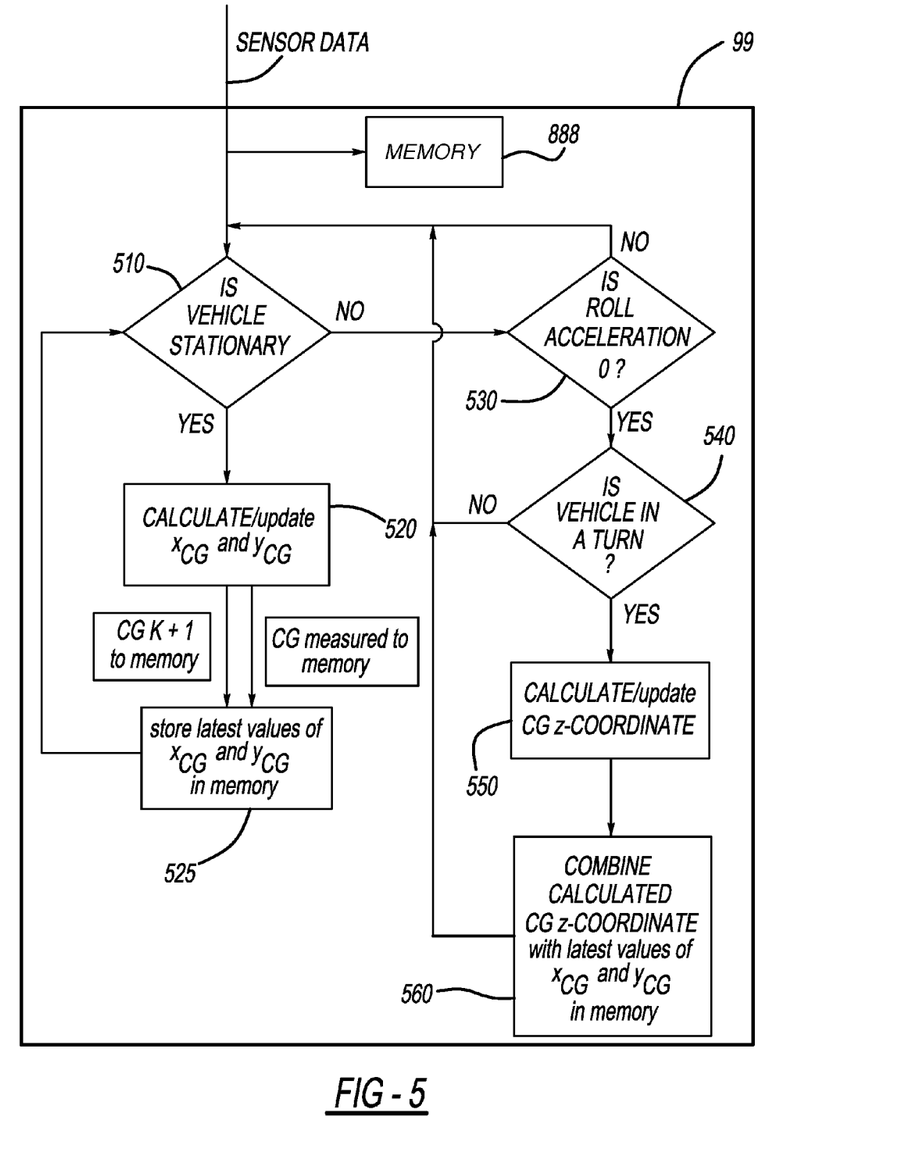
FIG. 5 shows a flow diagram illustrating a method for estimating CG x, y, and z-coordinates associated with the vehicle body.
Figure 5A:
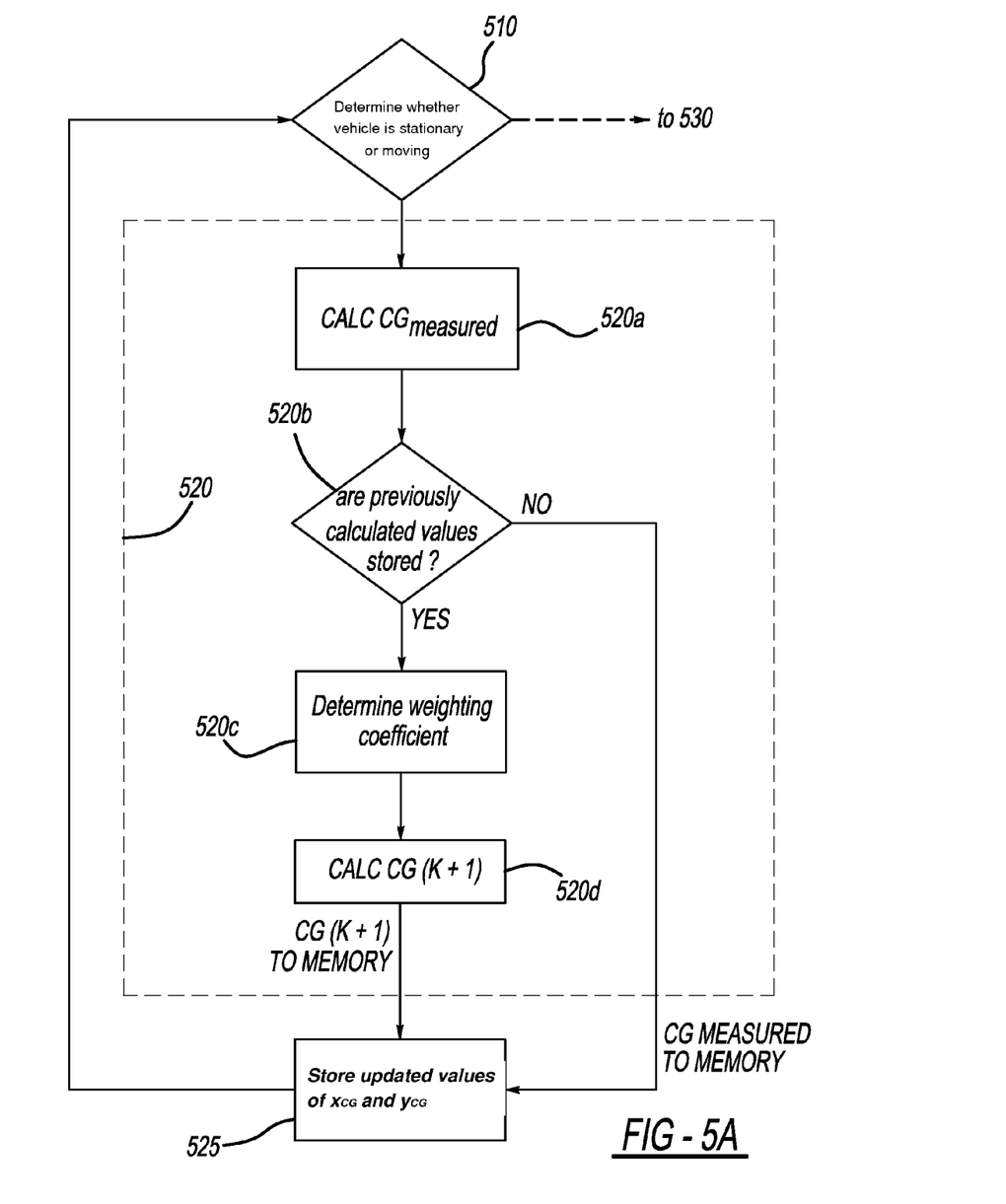
FIG. 5A shows a flow diagram of a process for updating estimated CG x and y coordinates.

FIGS. 5 and 5a show flow diagrams illustrating a method for estimating the CG x, y, and z-coordinates. In the embodiment shown, $z_{CG}$ is calculated using vehicle dynamics information collected and relayed to the controller 99 during a vehicle turn or during any vehicle maneuver which results in a lateral acceleration component $a_y$. Utilizing the above relationships in conjunction with data received from the pertinent vehicle sensors, the x, y, and z-coordinates of the CG can be dynamically re-calculated and the location of the CG can be dynamically updated both when the vehicle is stationary and as the vehicle loading changes.

Referring to FIGS. 5 and 5a, the VDCM 99 or another vehicle control means receives an ongoing flow of information (for example, spring displacement values, actuator hydraulic pressure values, lateral acceleration, vehicle speed, roll angular velocity and other information useable for estimating the vehicle CG location as described herein) from the pertinent vehicle sensors. This initial data set may be stored in a memory 888 for use in further calculations.

In step 510, the vehicle control means determines from the received sensor information whether the vehicle is stationary or moving. In one embodiment, this determination, is made using the vehicle speed, which may be estimated using any of a variety of known methods (for example, using data from individual wheel speed sensors).

If the vehicle is stationary, the process proceeds to step 520. If the vehicle is not stationary, the estimated x and y coordinates of the CG are not determined at this time and the process moves to step 530.

In step 520, the estimated x and y coordinates of the CG ($x_{CG}$ and $y_{CG}$) with respect to the reference point (0, 0, 0) in FIG. 4 are calculated or updated.

In step 520a (FIG. 5a), the values of $x_{CG}$ and $y_{CG}$ are calculated using relations (2) and (3) previously described in conjunction with the latest sensor data. These newly calculated values of $x_{CG}$ and $y_{CG}$ define the quantity $CG_{measured}$.

In step 520b, the vehicle control means determines if there are previously calculated values of the estimated x and y coordinates ($x_{CG}$ and $y_{CG}$) of the CG in memory to be updated. These previously calculated values are represented by the variable CG(k). If the memory location used to store the value of CG(k) is zero or empty (for example, in a case where the vehicle is started after being turned off), it is assumed that no current values exist for $x_{CG}$ and $y_{CG}$, and the newly calculated values of $x_{CG}$ and $y_{CG}$ (represented by the variable $CG_{measured}$) are stored in memory for further revision or usage in further computations. In addition, the value of $CG_{measured}$ is assigned to the variable CG(k).

If a value for CG(k) is already stored in memory, operations are performed to recalculate or update the values of $x_{CG}$ and $y_{CG}$ using the most recent sensor information. During updating of $x_{CG}$ and $y_{CG}$, the values of $x_{CG}$ and $y_{CG}$ calculated from the most recent sensor information to generate $CG_{measured}$ may be processed in conjunction with CG(k) (representing the stored, previously calculated values of $x_{CG}$ and $y_{CG}$) (for example, in a moving average operation or other known processing operation) to smooth out short-term fluctuations and spikes in the sensor data, thereby helping to reduce the uncertainty in the measurements when providing an updated value of $x_{CG}$ and $y_{CG}$. Such an operation, may be performed by, for example, a low-pass filter or other suitable means. One method of updating $x_{CG}$ and $y_{CG}$ in step 520 involves substeps 520c-d as shown in FIG. 5a.

In step 520c, a weighting coefficient α is determined for use in updating the CG x and y coordinate values. The weighting coefficient α is a constant between zero and 1 that determines the weighting of the current (most recently computed) CG x and y coordinate values with respect to the previously calculated values. In an alternative embodiment, the weighting coefficient is determined prior to entering step 520.

If α is closer to 1, the low pass filter will weight the previously calculated (or stored) value more heavily than the more current value. A value of α closer to zero will more heavily weight the most recently calculated or current CG value (i.e., $CG_{measured}$). In many implementations the value of α is a constant. In one embodiment, the choice of a value for α is based upon the need for rapid convergence of the estimates of the CG x and y coordinate values, and the level of noise anticipated or encountered in the data used to generate the estimates. In a particular embodiment, a value of 0.98 is assigned to a for systems that update the CG x and y coordinate value estimates every 100 ms. With this value, the estimate will capture 98% of a change in CG x and y coordinate location within 20 seconds. In cases where the CG x and y coordinate values are expected to change relatively frequently, previously calculated values should be given relatively less weight. In such a case, the value of a may be set initially at close to zero and then may gradually increase toward 1.0 as confidence in the estimate increases. As more and more data are acquired and more CG x and y coordinate values estimated, the effects of noise can be accounted for and/or reduced, and the level of confidence in the estimated CG values increases. In one example, when the vehicle senses that the fuel level has changed or that the vehicle occupant load may have changed, the value of a starts at 0.5 and gradually ramps up to 0.98 within a time period of 10 seconds.

Next, in step 520d, the values of $x_{CG}$ and $y_{CG}$ represented by $CG_{measured}$ are processed in conjunction with the values of $x_{CG}$ and $y_{CG}$ represented by CG(k) (which are the previously calculated values, now residing in memory) to generate a revised value CG(k+1) of the estimated vehicle CG position x and y coordinates $x_{CG}$ and $y_{CG}$, according to the relationship:

$$CG(k+1)=(\alpha^*CG(k))+((1-\alpha)^*CG_{measured}) \qquad (7)$$

This relation is applied to each of $x_{CG}$ and $y_{CG}$. That is, revised values of both $x_{CG}$ and $y_{CG}$ are generated according to the relations:

$$x_{CG}(k+1)=(\alpha^*x_{CG}(k))+((1-\alpha)^*x_{CG\ measured})$$

and $$y_{CG}(k+1)=(\alpha^*y_{CG}(k))+((1-\alpha)^*y_{CG\ measured})$$

where:
$x_{CG}(k+1)$ and $y_{CG}(k+1)$=the revised values of $x_{CG}$ and $y_{CG}$;
$x_{CG}(k)$ and $y_{CG}(k)$=the stored, previously calculated values of $x_{CG}$ and $y_{CG}$; and
$x_{CG\ measured}$ and $y_{CG\ measured}$=the most recently calculated or current values of $x_{CG}$ and $y_{CG}$.

The updated values of $x_{CG}$ and $y_{CG}$ are then stored in a memory in step 525 until further revision or usage in further computations. The process loop 510-520-525 is executed for as long as the vehicle remains stationary. When it is determined that the vehicle is in motion, the process goes from step 510 to step 530.

In step 530, while the vehicle is moving, vehicle sensor information is evaluated to determine the roll acceleration condition of the vehicle. With zero roll acceleration, calculation of the z-coordinate of the CG is simplified. The vehicle will have zero roll acceleration in, for example, a long turn. The roll acceleration can be estimated using a roll rate sensor or other suitable sensor(s). In one embodiment, as long as the roll rate sensor measurements are constant at values less than 0.2 degree/second, then the roll acceleration is assumed to be essentially zero. Alternatively, as long as the measured or calculated roll acceleration is below 1 degree/second$^2$, then the roll acceleration is assumed to be essentially zero. If the roll acceleration is deemed to be essentially zero, the process goes to step 540.

Once it has been determined that the roll acceleration is zero or effectively zero, the process goes to step 540. In step 540, the vehicle sensor data is evaluated to determine if the vehicle is in a turn. One method for detecting a turn is to evaluate the vehicle lateral acceleration data. If the vehicle is in a turn, the lateral acceleration will have a non-zero value. If the vehicle is following a straight path or is stationary, then the lateral acceleration will be zero.

A spurious non-zero reading may occur in the lateral acceleration sensors if, for example, a passenger or cargo is being loaded or unloaded from the vehicle. However, in this case, the vehicle is presumed not to be moving, so such non-zero sensor readings in a stationary vehicle may be ignored for purposes of calculating the location of the vehicle CG using the methods described herein.

The lateral acceleration can be measured using IMU 22, a discrete accelerometer which is common in active suspension systems, or any other suitable device. Alternatively, the lateral acceleration can be estimated using yaw rate data and vehicle speed data.

If the lateral acceleration is zero or it is otherwise determined that the vehicle is not in a turn, the process proceeds back to step 510, whereby evaluation of the roll acceleration, and lateral acceleration continues using the latest sensor data, until the lateral acceleration is non-zero or until the vehicle stops moving, at which point re-calculation and updating of the CG position x and y coordinates $x_{CG}$ and $y_{CG}$ may be resumed as previously described. If the lateral acceleration is non-zero or it is otherwise determined that the vehicle is turning, then the process proceeds to step 550.

Figure 6:
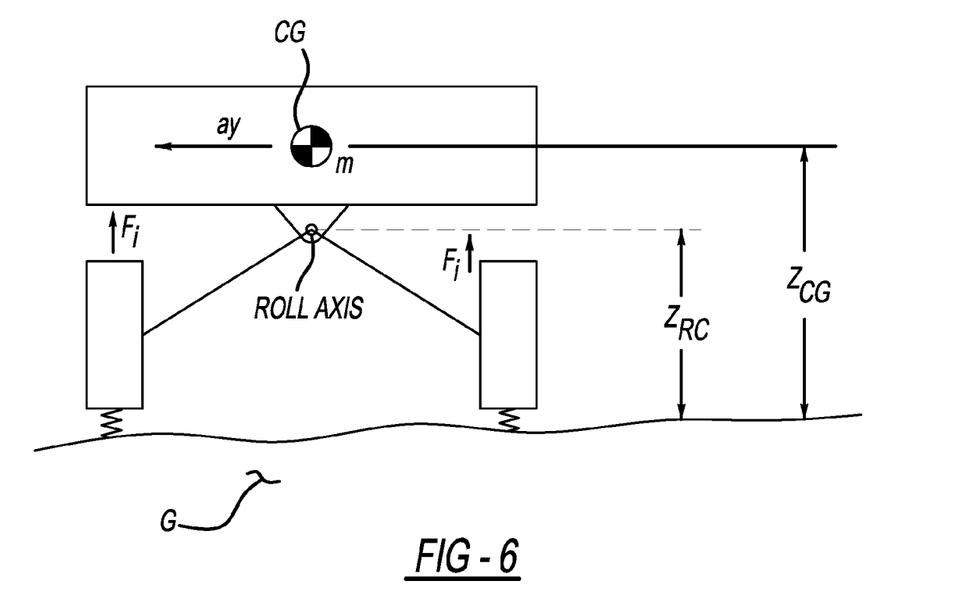
FIG. 6 is a schematic view showing various parameters used in estimating the vehicle center of gravity.

In step 550, the estimated CG z-coordinate or height $z_{CG}$ is calculated (or updated if previously calculated) using relation (8) below, in conjunction with the other relations and parameters previously discussed:

$$z_{CG}=((\Sigma F_i(y_i-y_{CG}))/(M_{SPRUNG}\,a_y))+z_{RC} \qquad (8)$$

where
$z_{CG}$=the CG z-coordinate
$z_{RC}$=the z-coordinate of the roll center axis
$a_y$=the lateral component of vehicle acceleration
The general location of $z_{RC}$ is shown in FIG. 6. Depending on the suspension configuration and other pertinent factors, $z_{RC}$ may be calculated and updated using known methods, or this parameter may be assigned a constant-value.

In step 560, after calculation of the CG z-coordinate $z_{CG}$, this coordinate may be combined with the most recently calculated $x_{CG}$ and $y_{CG}$ values to provide an estimate of spatial coordinates $(x_{CG}, y_{CG}, z_{CG})$ of the vehicle CG with respect to a predetermined reference point. This location can then be dynamically updated using pertinent sensor data gathered during motion of the vehicle. The process then returns to step 510 to continue processing new incoming sensor information as previously described.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. A vehicle control system configured for calculating x, y and z coordinates of a center of gravity (CG) of a vehicle having a plurality of wheels, the system comprising a controller configured for:
    a) determining whether the vehicle is stationary or moving;
    b) if the vehicle is stationary, calculating only estimated x and y coordinates of the x, y and z coordinates; and
    c) if the vehicle is moving, calculating only a z-coordinate of the x, y and z coordinates.

2. The system of claim 1 wherein the controller is further configured to, if the vehicle is stationary:
    b1) calculate most recent estimated x and y coordinates using a most recent set of sensor data;
    b2) determine if previously calculated estimates of the x and y coordinates are stored in the memory; and
    b3) if previously calculated estimates of the x and y coordinates are not stored in the memory, assign the most recent estimated x and y coordinates to the memory.

3. The system of claim 2 wherein the controller is further configured to calculate, when the vehicle is stationary, estimated x and y coordinates of the CG by, if previously calculated estimates of the x and y coordinates are stored in the memory, recalculating the estimates of the x and y coordinates using the most recent estimated x and y coordinates and estimates of the x and y coordinates calculated at a previous point in time.

4. The system of claim 3 wherein the controller is further configured to determine a weighting coefficient α indicative of a weighting of the most recent x and y coordinate values with respect to the previously calculated x and y coordinate values, for use in recalculating the estimates of the x and y coordinates.

5. A vehicle control system configured for estimating a location of a center of gravity (CG) of a sprung mass of a vehicle, the system comprising a controller configured for:
   a) determining whether the vehicle is stationary or moving;
   b) if the vehicle is moving, determining a roll acceleration of the vehicle;
   c) if the roll acceleration is effectively non-zero, determining if the vehicle is in a turn; and
   d) if the vehicle is in a turn, calculating an estimated z-coordinate of the CG of the vehicle sprung mass.

6. The system of claim 5 wherein the controller is further configured for:
   if the vehicle is not in a turn, repeating steps (a)-(c) until it is determined that the vehicle is turning or until the vehicle is stationary.

7. The system of claim 1 wherein the controller is further configured for:
   if the vehicle is moving, determining a roll acceleration of the vehicle;
   if the roll acceleration is effectively non-zero, determining if the vehicle is in a turn; and
   if the vehicle is in a turn, calculating an estimated z-coordinate of the CG of the vehicle sprung mass.

8. The system of claim 5 wherein the controller is further configured for combining the estimated z-coordinate of the CG with most recently calculated values of x and y coordinates of the CG to provide an estimate of spatial coordinates ($x_{CG}$, $y_{CG}$, $z_{CG}$) of the vehicle CG with respect to a predetermined reference point.

9. A method for estimating values of coordinates of a location in space of a center of gravity (CG) of a vehicle, the method comprising steps of, by a controller in a vehicle control system:
   a) determining whether the vehicle is stationary or moving; and
   b) responsive to the determination made in step (a), calculating values for only one of a first portion of the coordinates and a second portion of the coordinates,
   wherein coordinates in the second portion are different from coordinates in the first portion.

10. A vehicle including a system in accordance with claim 1.

11. The system of claim 5 wherein the controller comprises a vehicle dynamics control module.

12. A vehicle including a vehicle control system in accordance with claim 5.

13. A vehicle configured for implementing a method in accordance with claim 9.

14. The system of claim 1 further comprising a sensor operatively coupled to each wheel of the plurality of wheels, each sensor being configured for providing sensor data to the controller, and wherein the controller is configured to calculate the estimated x and y coordinates of the CG using the sensor data.

15. The system of claim 14 wherein the sensor operatively coupled to at least one wheel of the plurality of wheels is a wheel displacement sensor.

16. The system of claim 14 wherein the sensor operatively coupled to at least one wheel of the plurality of wheels is a pressure sensor.

* * * * *